June 19, 1928.
E. WIDMER
1,673,961
CELL PACKING SYSTEM FOR EXPEDITION AND CONSERVATION OF EGGS
Filed May 7, 1926
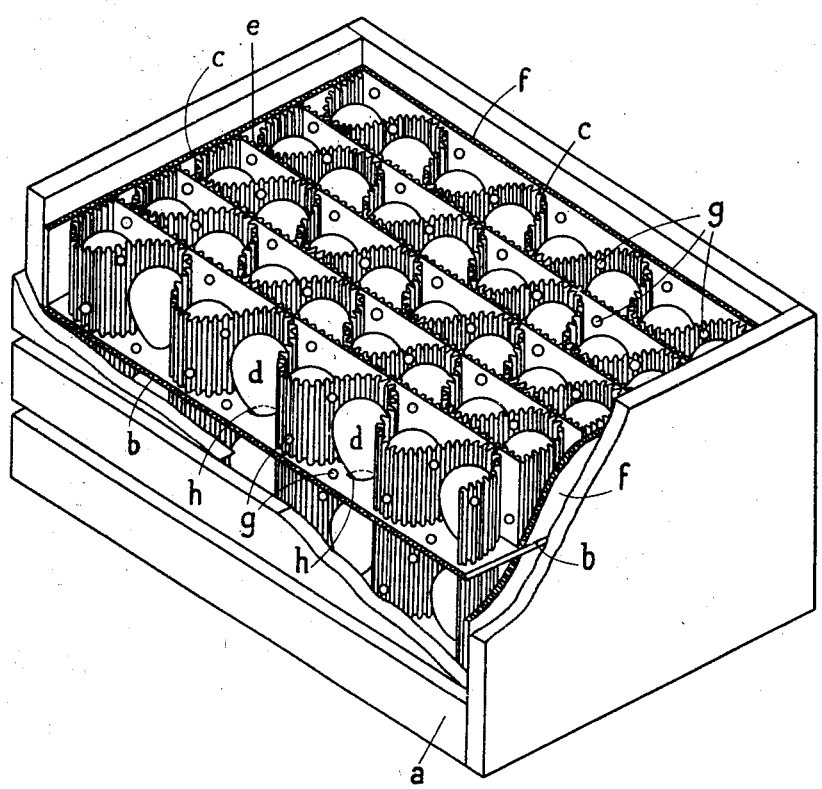
Inventor
Emil Widmer
By
Atty.

Patented June 19, 1928.

1,673,961

UNITED STATES PATENT OFFICE.

EMIL WIDMER, OF ZURICH, SWITZERLAND.

CELL-PACKING SYSTEM FOR EXPEDITION AND CONSERVATION OF EGGS.

Application filed May 7, 1926, Serial No. 107,502, and in Switzerland May 27, 1925.

The present invention relates to a cell-packing system for expedition and conservation of eggs. This packing possesses a framework which is composed of wave-like diaphragms, whereby the eggs packed in the framework-cells are enclosed by the diaphragms traversing between them.

The invention is illustrated as an example in the accompanying drawing.

A box $a$ contains intermedial bottoms $b$, upon which the framework consisting of wave-like diaphragms $c$ is disposed. The diaphragms $c$ pass between the eggs $d$ which have been brought into the framework-cells, whereby the eggs are tightly enclosed and firmly held in position. The diaphragms prevent the touching of neighboring eggs, and avoid any damage in consequence of rough handling. Longitudinal partitions $e$ are disposed between the diaphragms $c$, and moreover the inside part of the box is lined by protecting walls $f$. To answer this purpose it is preferable to build of corrugated cardboard not only the intermedial bottoms $b$, but also the partitions $c$, $e$ and $f$. They are provided with air-holes $g$ which are situated opposite to those in the longitudinal protection walls $f$ of the boxes. As a consequence of the perforation of the packing this latter keeps dry, even in a sweating state of the eggs, because there is a constant ventilation of the framework-cells, in which the eggs are placed. By this arrangement an incontestable hygienical packing will result, and therefore an infection caused by packing will be excluded.

The eggs $d$ may be brought directly upon the intermedial bottoms $b$, or introduced with their pointed end into the holes $h$. The inserting holes $h$ assure a vertical position of packed eggs, whereby the upwards rising yolk touches the cell-membrane of the egg; as a rule the said cell-membrane does not reach the blunted end of the egg, so that an intervening space will always remain in it. Any disadvantageous contact between the yolk and the shell of the egg will therefore be avoided. If it is a question of a long storing, for instance in a refrigerating installation, the eggs in conformity with said arrangement will be inserted into the holes $h$, in which case the longitudinal partitions become superfluous. On the other hand for transportation the eggs are brought upon the intermedial bottoms $b$. The egg-boxes have then to be placed in the vehicles in such a way, that the longitudinal walls $e$ will be transversal to the direction of carriage, whereby they will specially absorb percussions resulting from shunting in the railway stations, and so prevent the eggs from breakage.

The partitions $c$, $e$ and $f$ as well as the intermedial bottoms $b$ instead of being produced from corrugated card-board, may be made of any other suitable and elastic material, and the partitions $c$ may be rigid or flexible. Flexible partitions are preferable, because they can be simply pulled between the eggs upon each one of the intermedial bottoms, so that the eggs are tightly enclosed.

I claim:

A packing for round objects in layers in crates, comprising a soft, readily bending packing substantially sinuously placed around the objects as they are placed in rows in a crate and conforming to the various sizes of the objects, from one end of the row to the other, and vertical partitions separating the rows, said strip being detached from partitions, without previous formation into sinuous shape, and lying close to the various objects of different sizes in a row.

In testimony that I claim the foregoing as my invention, I have signed my name.

EMIL WIDMER.